United States Patent [19]

Daniels

[11] Patent Number: 4,705,218

[45] Date of Patent: Nov. 10, 1987

[54] NOZZLE STRUCTURE FOR A ROOT FEEDING DEVICE

[75] Inventor: Jay S. Daniels, Des Moines, Iowa

[73] Assignee: Ross Daniels, Inc., Des Moines, Iowa

[21] Appl. No.: 871,687

[22] Filed: Jun. 9, 1986

Related U.S. Application Data

[63] Continuation of Ser. No. 722,599, Apr. 12, 1985, abandoned.

[51] Int. Cl.⁴ .............................................. B05B 1/14
[52] U.S. Cl. ................................... 239/271; 111/7.1; 239/310; 239/548; 405/269
[58] Field of Search ............... 239/104, 271, 276, 310, 239/561, 567, 548; 405/269; 111/6, 7.1, 7.2, 7.3, 7.4

[56] References Cited

U.S. PATENT DOCUMENTS

| | | | |
|---|---|---|---|
| 1,997,097 | 4/1935 | Bartlett | 111/7.1 |
| 2,306,165 | 12/1942 | Irish | 111/7.1 |
| 2,580,755 | 1/1952 | Funk | 111/7.4 |
| 2,625,123 | 1/1953 | Morgan | 111/7.1 |
| 2,875,713 | 3/1959 | Shoffner | 111/7.1 |
| 3,618,539 | 10/1971 | Daniels | 239/310 |
| 3,783,804 | 1/1974 | Platz | 111/7.4 |

*Primary Examiner*—Andres Kashnikow
*Assistant Examiner*—Michael J. Forman
*Attorney, Agent, or Firm*—Rudolph L. Lowell

[57] ABSTRACT

The nozzle structure for a root feeding device includes a ground inserting tube or pipe having a nozzle unit at the end thereof formed with an axially extended bore and radially extended fluid discharge passages intermediate the ends thereof. The nozzle unit is generally comprised of a pair of coaxially aligned cone sections with the outer cone section of a reduced size and the outlets of the radial passages positioned between the adjacent ends of the cone sections. The fluid discharged from the outer end of the axial bore acts to pre-soften or lubricate the soil for hard ground penetration; and the fluid from the radial passages assists penetration and is discharged into a receiving chamber formed about the nozzle unit, when in the soil, for ground dispersion annularly about the nozzle unit.

1 Claim, 5 Drawing Figures

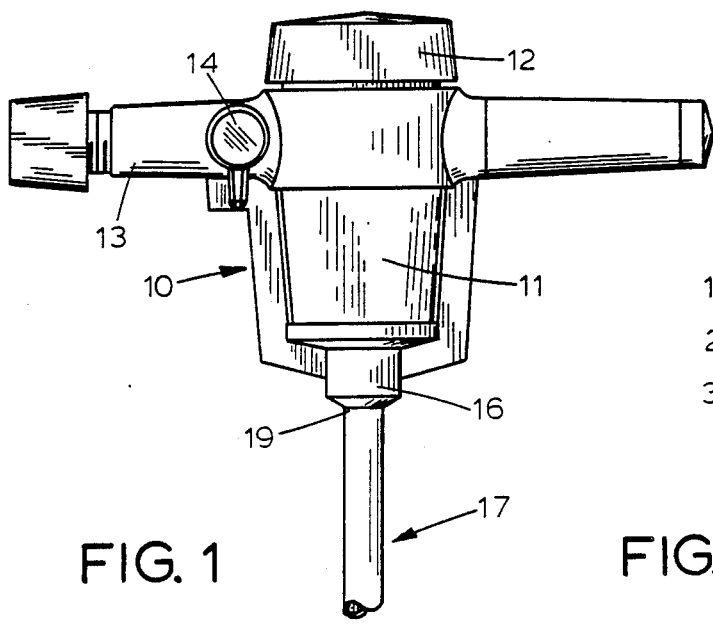
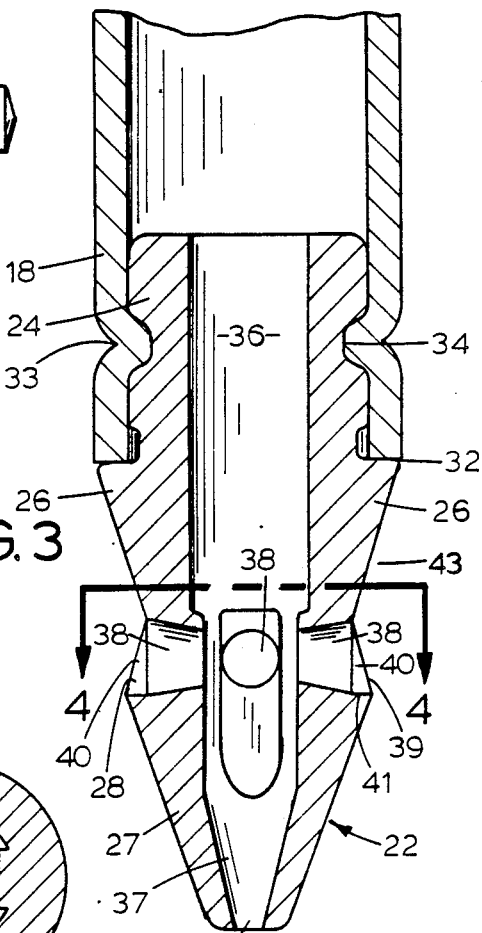
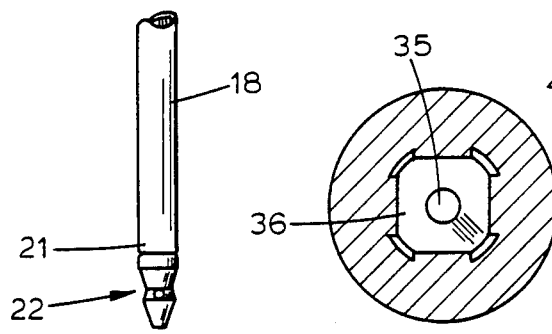
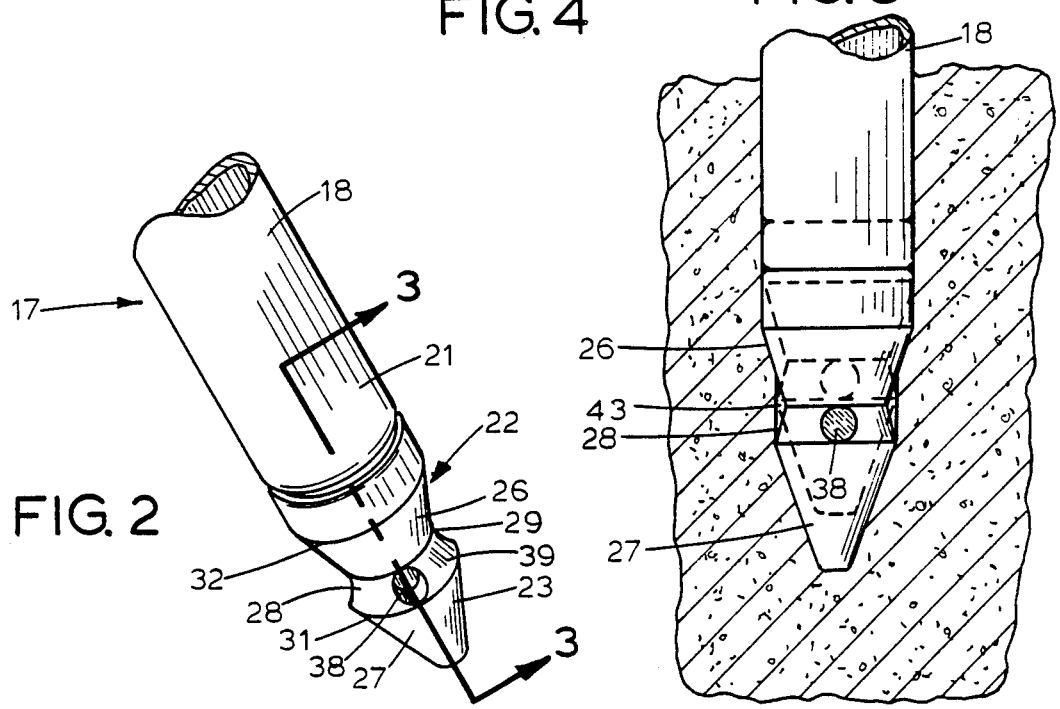
FIG. 1
FIG. 2
FIG. 3
FIG. 4
FIG. 5

4,705,218

NOZZLE STRUCTURE FOR A ROOT FEEDING DEVICE

This is a continuation of application Ser. No. 722,599, filed Apr. 12, 1985 now abandoned.

BACKGROUND OF THE INVENTION

Root feeding devices are used in the irrigating and fertilizing of root systems for trees and plants having roots an appreciable distance below the ground surface. Where the nozzle unit of the feeding device has a uniform outer diameter the outlets of radially extended passages tend to become clogged and the fluid discharged therefrom during the irrigation or fertilization period tends to follow linear paths radially of the nozzle unit. Nozzle units of this general type are disclosed in U.S. Pat. Nos. 2,505,174; 3,618,539; 2,302,799; 1,650,081; 2,242,789; and 2,214,083. In U.S. Pat. No. 3,397,541, the nozzle unit functions as a control valve providing only an axial flow of fluid while being inserted, and then, upon partial retraction of the nozzle unit, a radial or fan type flow of fluid. Softening and lubrication of the soil is accomplished solely by the axial flow of fluid, unless the device is manipulated to provide additional lubrication by the radial flow.

Lawn soil generally found in the area of the home yard or in an urban or suburban setting consists of minerals, organic matter and, particularly in the case of lawns, of a multitude of roots of various sizes. In the usual method of insertion of the nozzle tip of a feeding device into the soil, the tip acts as a wedge to push the soil away from the tip supporting tube. In the case of dry or loose soil, this pushing or spreading action may force cracks or fractures in the soil structure. As the water is ejected from the nozzle, and particularly in dry or hard soil, the water is often directed vertically upwardly about the tube since it tends to follow the path of least resistance, rather than spreading laterally outward into the hard or dry soil. The nozzle structure of the invention softens and moistens the soil in the vicinity of the nozzle tip to increase its compressibility. The subsequent wedge action of the nozzle tip forms a seal around the tube which acts to direct the water laterally around the nozzle structure to substantially reduce the vertical back up of the water toward the ground surface.

SUMMARY OF THE INVENTION

The nozzle structure of this invention provides for its easy and convenient ground insertion with a minimum of manual effort. The nozzle unit has non-clogging fluid outlets and includes a pair of coaxially extended wedge or cone-shaped sections, each of which is of a generally inverted conical shape connected together by an inset annulus section. An axial bore in the nozzle unit terminates in an outlet of reduced size and the annulus section has radially extended passages in fluid registration with the bore. The fluid flow from the tip of the nozzle unit initially softens and lubricates the soil for easy soil penetration of the first conical section and the fluid from the radial passages softens and lubricates the soil about the remainder of the nozzle unit to provide for the continued easy insertion of the nozzle structure. When the nozzle structure has been inserted the fluid from the passages in the annulus section tend to collect about the nozzle unit for dispersion in concentric soil portions about the nozzle structure.

DESCRIPTION OF THE DRAWINGS

FIG. 1 is a side view of a root feeding device showing the nozzle structure of this invention in assembly relation therewith;

FIG. 2 is an enlarged detail perspective view of the soil inserting end of the nozzle structure;

FIG. 3 is an enlarged sectional view taken on the line 3—3 of FIG. 2;

FIG. 4 is an enlarged sectional view on the line 4—4 of FIG. 3; and

FIG. 5 is a side view of the soil inserting end of the nozzle structure illustrating the manner of its use.

DESCRIPTION OF THE INVENTION

Referring to the drawings, there is illustrated in FIG. 1 a root-feeding device that includes a body member 10 for a chemical cartridge container 11 provided with a threadable fill cap 12. A water inlet 13 on the body member 10 is connectible to a usual garden hose (not shown) for supplying water to the container 11 at a rate controlled by a valve unit 14. The fluid from the container 11 passes through an outlet 16 on the body member 10 that is connectible to the nozzle structure 17 of this invention. For a more detailed description of the root feeding device, reference is made to U.S. Pat. No. 3,618,539.

The nozzle structure 17 (FIGS. 1 and 2) includes a pipe member 18 that has an inlet end 19 secured to the outlet 16 of the body member in any usual manner such as by a threaded engagement therewith. The outlet end 21 of the pipe member is equipped with a nozzle unit 22 of a unit construction and formed with a ground penetrating section 23 and a pipe connecting section 24.

The ground penetrating section 23 (FIGS. 2 and 3) is generally formed with a pair of inverted coaxially extended cone sections 26 and 27 connected by an intermediate annulus section 28. The cone section 26 adjacent the pipe connecting section 24 is enlarged relative to the cone section 27 which constitutes the tip of the nozzle unit 22. The cone section 26 is of a generally inverted frustum shape with the annulus section 28 at the junction 29 thereof with the cone section 26 being of a reduced diameter relative to its junction 31 with the cone section 27 and the junction 32 of the frustum cone section 26 with the pipe connecting section 24 being greater than the junction 29.

The pipe connecting section 24 (FIG. 3) has an outer diameter substantially equal to the inner diameter of the pipe member 18 while the diameter of the base end of the cone section 26 at the junction 32 is substantially equal to the outer diameter of the pipe member 18. The pipe connecting section 24 is thus received within the outlet end 21 of the pipe member 18, a distance defined by the abutting engagement of the pipe end face with the cone section 26 so that the outer periphery of the junction 32 is concentrically aligned with the outer peripheral surface of the pipe member 18. The pipe is then indented or pressed at 33 into an annular recess 34 in the pipe supporting section 24, to complete the assembly of the nozzle unit 22 with the pipe member. It is to be understood that the nozzle unit 22 may be secured to the tube 18 by a threaded or press fit engagement therewith.

An axial bore 36 (FIGS. 3 and 4) in the nozzle unit 22 terminates in a tapered section 37 to form an outlet 35 of a reduced diameter relative to the inlet at the inner end of the section 37. The annulus section 28 is formed with two pairs of diametrically opposite radial passages 38 of an inwardly tapered shape, with the outlets 40 of each thereof terminating in the peripheral surface 39 of the annulus section 28. As shown in FIGS. 2 and 3, the surface 39 is inclined inwardly from the junction 31 to the junction 29 of the annulus section 28 with the frustum cone section 26. The outlet 40 of each radial passage 34 is larger than the outlet 35 of the tapered bore section 37 at the tip of the nozzle unit 22.

In use, on an initial insertion of the nozzle structure 17 within the ground, fluid from the tip of the nozzle unit softens and lubricates the soil to facilitate insertion and penetration of the cone section 27 of the nozzle unit 22. The fluid flow from the radial passages 38 provides further lubrication for the soil penetration of the cone section 26 and the pipe member 18. By virtue of the tapered construction of the radial passages 38 and the section 37 of the axial bore 36, the soil penetration of the nozzle structure takes place with a substantial elimination of any clogging of the fluid outlets. Thus, any soil entering the bore section 37 is permitted entrance into the nozzle unit 22 against the fluid flow outwardly from the axial bore 36 so as to become disintegrated and entrained therein for later discharge from the nozzle unit. The termination of the radial passages 38 in the peripheral surface 39 of the annulus section 28 provides for the lower portions 41 of the passage outlets 40 acting as shields for directing soil away from the outlets 40 as the nozzle structure is moved downwardly into the soil.

On the penetration of the nozzle structure 17 to a desired depth (FIG. 5) the flow from the tapered bore section 37 acts to irrigate the soil axially of the nozzle structure, and the fluid from the radial passages 38 tends to flow within an annular chamber 43 formed by the annulus section 28 with the surrounding soil so as to irrigate the soil in a pattern of expanding annular concentric portions about the pipe member. The irrigation of the soil in concentric annular portions may be facilitated by raising the nozzle structure a short distance, after full penetration has been achieved. This lifted position, illustrated by dotted lines in FIG. 5, tends to increase the volume capacity of the annular chamber 43 about the annulus section 28.

Although the invention has been described with respect to a preferred embodiment thereof, it is to be understood that it is not to be so limited since changes and modifications can be made therein which are within the full intended scope of this invention as defined by the appended claims.

I claim:

1. A nozzle structure for a root feeding device having a cartridge receiving chamber means with a fluid outlet and a fluid inlet for receiving fluid under pressure, said nozzle structure comprising:
    (a) a soil penetrating tube connected at one end to said outlet;
    (b) a nozzle unit having a first portion positioned within and secured to the opposite end of said tube, and a second portion confined within the transverse cross sectional area of the tube and projected outwardly from said opposite end of the tube;
    (c) said second portion comprising a coaxially aligned outer cone section having a base portion and a tip portion, and inner frustum cone section including a base end in abutting engagement with said opposite end of the tube and an intermediate annulus section with a peripheral surface reversely inclined relative to the peripheral surface of each of said inner and outer cone sections, said nozzle unit having an axial bore extended there through and said intermediate section a plurality of radial fluid discharge passage means in fluid registration with said axial bore, with said base end having a diameter substantially equal to the outer diameter of said tube and greater than the diameter of the base portion of said outer cone section, and
    (d) said axial bore having an outlet in said tip portion, said outlet being formed in a tapered portion of said axial bore and being of reduced diameter with respect to said bore and each of said radial passage means having an outlet in the intermediate section with a diameter greater than the diameter of the outlet of said axial bore.

* * * * *